(12) United States Patent
Visagamani et al.

(10) Patent No.: US 12,555,070 B2
(45) Date of Patent: Feb. 17, 2026

(54) RFID KANBAN SYSTEM AND METHODS OF USE

(71) Applicant: Cepheid, Sunnyvale, CA (US)

(72) Inventors: Jayaprakash Visagamani, Sunnyvale, CA (US); Suneetha Yanimineni, Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 329 days.

(21) Appl. No.: 18/067,589

(22) Filed: Dec. 16, 2022

(65) Prior Publication Data

US 2023/0196281 A1  Jun. 22, 2023

Related U.S. Application Data

(60) Provisional application No. 63/290,808, filed on Dec. 17, 2021.

(51) Int. Cl.
*G06Q 10/00* (2023.01)
*G06K 19/07* (2006.01)
*G06Q 10/087* (2023.01)

(52) U.S. Cl.
CPC ....... *G06Q 10/087* (2013.01); *G06K 19/0723* (2013.01)

(58) Field of Classification Search
CPC .................. G06Q 10/087; G06K 19/0723
See application file for complete search history.

(56) References Cited

U.S. PATENT DOCUMENTS

2022/0230125 A1*  7/2022  Vedantam ...... G06Q 10/063114

* cited by examiner

*Primary Examiner* — Rokib Masud
(74) *Attorney, Agent, or Firm* — McAndrews, Held & Malloy, Ltd.

(57) ABSTRACT

RFID-based operations management systems and methods are provided herein, particularly RFID based Kanban systems. Such system can realize increased efficiencies, improved visibility of inventory throughout the workflow and improved response to variations in demand. RFID based solutions can automatically transact consumption of Kanban inventory in real-time and trigger replenishment signals to warehouses automatically, resulting in increased Kanban inventory accuracy and lower manual efforts for replenishment and consumption posting. This approach can interface with existing operational management software (e.g. ERP systems, such as SAP) seamlessly integrating with product manufacturing workflows. Such systems are uniquely applicable to manufacture of biological testing kits, where demands fluctuate considerably in response to crises, disasters, epidemics and pandemics.

21 Claims, 16 Drawing Sheets

FIG. 14

ZWM_KNBN_PACK: Display of Entries Found

Search in Table: ZWM_KNBN_PACK  Kanban Package data
Number of hits: 58
Runtime: 0  Maximum no. of hits: 500

| Plant | Material | Location Id | Pck Qty | BUn | Trs Ind | Cost elem. | Cost Ctr | WhN | Typ | Storage Bin | Decomission Flag |
|---|---|---|---|---|---|---|---|---|---|---|---|
| 1000 | 001-1526 | REAGENT | 10.000 | EA | GI_G | 530070 | | | | | X |
| 1000 | 001-1527 | REAGENT | 10.000 | EA | GI_G | 530070 | | | | | X |
| 1000 | 001-1558 | REAGENT | 500 | G | B2B | | | 002 | FLR | B1-BF-RGNT | X |
| 1000 | 001-1559 | REAGENT | 1.000 | G | B2B | | | 002 | FLR | B1-BF-RGNT | X |
| 1000 | 001-1580 | REAGENT | 200.000 | EA | GI_G | 530070 | | | | | X |
| 1000 | 001-1581 | REAGENT | 200.000 | EA | GI_G | 530070 | | | | | X |
| 1000 | 001-1624 | REAGENT | 20.000 | EA | GI_G | 530070 | | | | | X |
| 1000 | 001-1743 | REAGENT | 20.000 | EA | GI_G | 530070 | | | | | X |
| 1000 | 001-1850 | REAGENT | 250.000 | EA | B2B | | | 002 | FLR | B1-BF-RGNT | X |
| 1000 | 001-1851 | REAGENT | 250.000 | EA | B2B | | | 002 | FLR | B1-BF-RGNT | X |
| 1000 | 001-1852 | REAGENT | 250.000 | EA | B2B | | | 002 | FLR | B1-BF-RGNT | X |
| 1000 | 001-2221 | REAGENT | 24.000 | EA | GI_G | 530070 | | | | | X |
| 1000 | 001-2222 | REAGENT | 20.000 | EA | GI_G | 530070 | | | | | X |
| 1000 | 001-2251 | REAGENT | 5.000 | G | B2B | | | 002 | FLR | B1-BF-RGNT | X |
| 1000 | 001-2447 | REAGENT | 10.000 | EA | GI_G | 530070 | | | | | X |
| 1000 | 001-2523 | REAGENT | 1.000 | EA | B2B | | | 002 | FLR | B1-BF-RGNT | X |

RFID KANBAN SYSTEM AND METHODS OF USE

This application is a Non-Provisional of and claims the benefit of priority of U.S. Provisional Application No. 63/290,808 filed on Dec. 17, 2021, the entire contents of which are incorporated herein by reference for all purposes.

BACKGROUND OF THE INVENTION

Current Kanban processes to replenish shop floor inventory is inefficient. These processes are very labor intensive, not real-time and there is generally no visibility to floor stock inventory. In the traditional approach, Kanban cards are hand carried to communicate Kanban requirements to the warehouse/stockroom for Kanban requirements that occur on the manufacturing shop floor. Moreover, this approach requires that personal performs a manual SAP transaction to post the Kanban material consumption and create an order for replenishment of an exhausted inventory. This approach has no visibility of inventory throughout the workflow, is time-consuming and labor intensive, and prone to human error. Moreover, this traditional process still result in shortages and delays due to missing and misplaced inventory or fluctuations in demands.

Thus, there is a need for improved operations management systems that address the challenges above, in particular, that provide more accurate and efficient accounting and tracking of inventory, replenishment and that improves visibility of inventory and meets inventory demands as they arise.

BRIEF SUMMARY OF THE INVENTION

In one aspect, the invention pertains to use of RFID-based operations management system, particularly an RFID-based Kanban system, which can realize increased efficiencies, improved visibility of inventory throughout the workflow and improved response to variations in demand. An RFID based solution can automatically transact consumption of Kanban inventory in real-time and trigger replenishment signals to warehouse automatically, which results in increased Kanban inventory accuracy and lower manual efforts for replenishment and consumption posting. In some embodiments, this approach is integrated within a product manufacturing workflow for biological testing kits, where demands can fluctuate considerably in response to crises, disasters, epidemics and pandemics.

In one aspect, the invention pertains to an RFID based inventory management system for product manufacturing. The system can include multiple RFID tags associated with various types of inventory used in manufacturing a product in a workflow; multiple RFID sensors disposed at one or more locations along a transport path of the workflow, wherein the plurality of RFID sensors are disposed at fixed locations; and an operations management system. An operations management system (OMS) is a software system that manages various business processes, and can include one or more systems integrated and/or interface therewith. The OMS can include multiple types of systems including any of: Enterprise Resource Planning (ERP) software (e.g. SAP, Oracle), Manufacturing Execution Systems (MES), as well as logistics and tracking software systems, and robotic control and management systems that move inventory from one location to another. Typically, an OMS is configured to perform replenishment requests of inventory of various types. In some embodiments of this RFID based system, the OMS is further configured to: receive inventory tracking information from the plurality of RFID sensors; determine an amount of a first type of inventory at a given location; and automatically initiate a replenishment request for a first type of inventory upon a determination that the first type of inventory is depleted.

In some embodiments, the operations system is configured to determine depletion of inventory based on real-time determination of inventory in differing locations along the workflow. In some embodiments, the operations system is further configured to determine depletion of inventory based additionally on a determination of demand that is variable.

In another aspect, the invention pertains to methods of managing inventory for product manufacturing utilizing an RFID-based management system. Such methods can include steps of: producing RFID tags associated with various types of inventory used in manufacturing a product in a workflow, each of the RFID tags applied to the various types of inventory; detecting the various types of inventory with a plurality of RFID sensor disposed at one or more locations along a transport path of the workflow, wherein the plurality of RFID sensors are disposed at fixed locations; receiving inventory tracking information from the plurality of RFID sensor with an operations management system (OMS); determining, with the OMS, an amount of a first type of inventory at one or more locations along the workflow; and automatically initiating, with the OMS, a replenishment request for a first type of inventory upon a determination that the first type of inventory is depleted.

In another aspect, the method includes determining inventory based on real-time determination of inventory in differing locations along the workflow. In some embodiments, the method determine depletion of inventory based on real-time determination of inventory in along the workflow and a real-time determination of demand that is variable.

BRIEF DESCRIPTION OF THE DRAWINGS

FIGS. 14-15 show control tables utilized in mapping material movement, in accordance with some embodiments.

FIGS. 16-17 show an RFID tag data table utilized by the middleware, in accordance with some embodiments.

DETAILED DESCRIPTION OF THE INVENTION

Embodiments of the invention pertain to RFID-based inventory management system for product manufacturing. In particular, the invention pertains to a RFID based Kanban management of inventory for manufacturing of biological test kits. In some embodiments, the inventory management system is touch-free such that inventory can be determined/tracked at one or more locations throughout the workflow without requiring any intervention by human personnel for tracking purposes.

Figure 2:
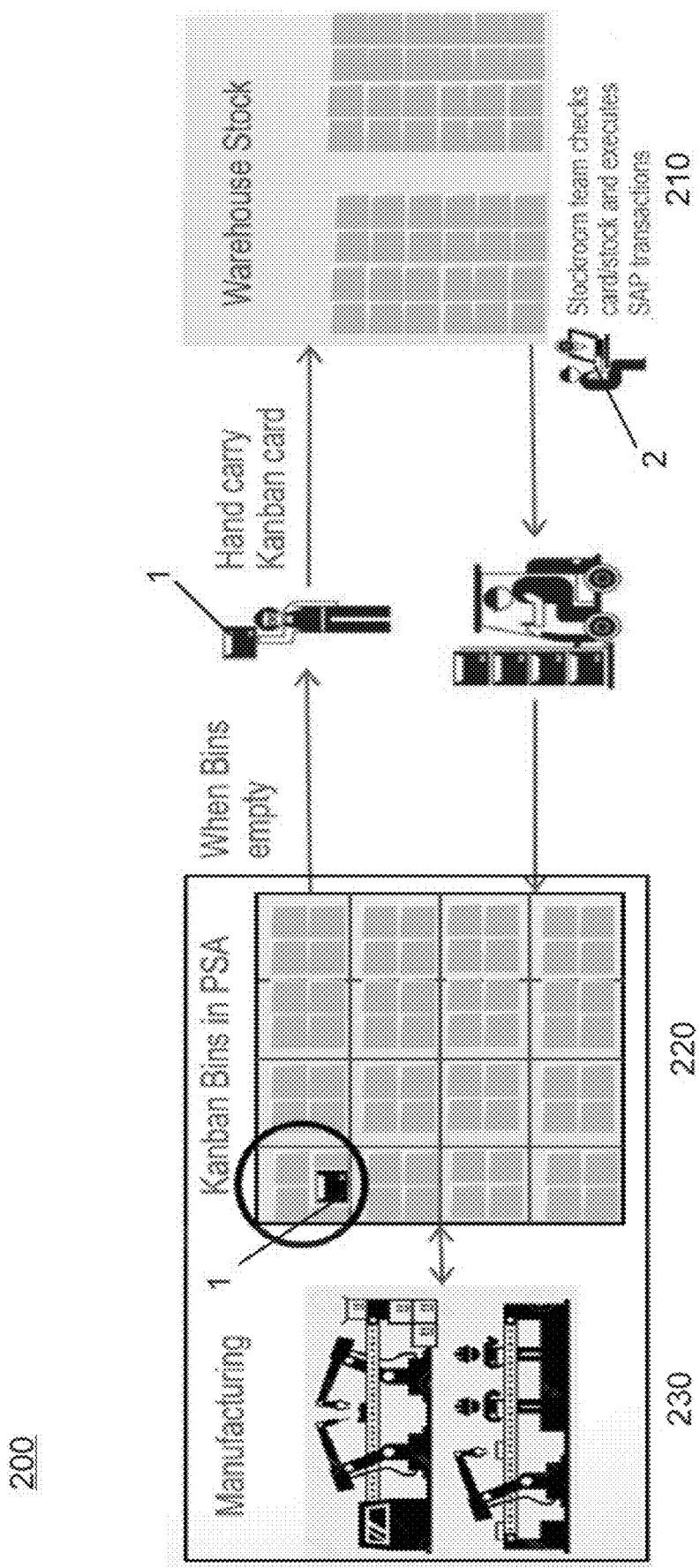
FIG. 2 shows a traditional manual Kanban process for managing inventory for product manufacturing.

Current card-based Kanban processes, commonly used in industry, are inefficient. Traditional Kanban cards are hand carried to communicate to warehouse/stockroom for Kanban materials requirements on manufacturing shop floor, as shown in FIG. 2. Warehouse/stockroom team perform manual SAP transaction to post Kanban material consumption which is very labor intensive. Inventory visibility is lost immediately after the stockroom team performs the transaction. In conventional Kanban process, a Kanban card is used for a particular action/task associated with a particular type of inventory. In one example, a Kanban card for Backflush materials is used to represent an SAP transaction (e.g. "Perform Bin-to-Bin transfer from warehouse to backflush BINs as indicated on the cards"). In another example, a Kanban card for Consumables is associated with another SAP transaction (e.g. "Perform Goods issue to cost center/GL account as indicated on the cards"). Various other Kanban cards can be used for various other SAP transactions. The various Kanban cards are posted on a board by manufacturing team as and when the Kanban bins are empty. Stockroom team manually pick up these cards and replenish the stock in the Kanban bins. Hand written post it notes are used to communicate special instructions. In a mid to large-scale operation, there are hundreds of transactions per week, typically about 500 transactions or more, and products can require many different parts, for example biological testing kits can require about 260 different parts, which must each be inventoried and replenished as needed, during the manufacturing process. Each transaction takes about 7 minutes including hand carrying and system transactions, such that the total time spent by personnel on dealing with accounting for consumption/replenishment is substantial. Further, these processes are prone to human error, which can cause inventory shortages and delays.

In one aspect of the invention, the use of a touch free RFID Kanban operation can overcome the drawbacks associated with conventional Kanban operations described above. In some embodiments, each Kanban inventory packets contains active RFID tags. The manufacturing operator pulls inventory packets with RFID tags and walks to shop floor. RFID tag data is automatically read by RFID readers at any location along the workflow path, typically at Gateways/Check-in/Check-out points, and the RFID data is transmitted to the Operations Management System (OMS) (e.g. ERM, SAP, MES) as logical transactions posting consumption/replenishment transactions. When time to replenish, Kanban bin-RFID tags are auto printed at the warehouse. The warehouse picks materials and delivers to Kanban bins as inventory packets with RFID tags.

It is appreciated that the OMS can include one or more software systems that facilitate one or more tasks of the manufacturing workflow. For example, the OMS can receive information regarding product inventory, which can include inventory of any supplies/components used in manufacturing of the product. The OMS can also process procurement request for new inventory to the warehouse, replenishment requests for inventory from the warehouse to the Kanban bins and/or manufacturing, pick requests from the Kanban bins to manufacturing, as well as order and shipping requests of the product to consumers. In some embodiments, the OMS can receive or determine an inventory demand based on past operations, as well as real-time demand based on changes in demand (e.g. rates of change, drastic fluctuations in demand associated with increased orders receive, shortages of certain inventory, etc.). In some embodiments, the OMS can include one or more software solutions for processing inventory information and performing any of the tasks or request described herein. The software can include Enterprise Resource Planning (ERP) software, and/or Systems, Applications and Products in data processing (SAP). In some embodiments, the RFID-based system described herein interfaces with the OMS through a specialized middle-ware software module that is configured to interface with RFID sensor software (e.g. Tagit Solutions). In some embodiments, the middle-ware software module is configured to interface with SAP software system so that SAP requests previously initiated by human personnel are automatically initiated by the middle-ware module, thereby allowing a traditional operations system staffed by human personnel to be replaced by the middle-ware module working in conjunction with RFID sensors/detection. In some embodiments, the OMS application further includes additional interfaces to produce RFID tags for incoming inventory and the RFID data is associated with the inventory in the SAP system, as well as the overall ERP. In some embodiments, the middle-ware module is configured to interface directly with an existing ERP system. In some embodiments, the middle-ware module is configured to interface with both an existing ERP system (e.g. SAP) managing operations in product manufacturing. The middle-ware software can also be integrated within the overall OMS. The middle-ware software is embodied by executable instructions recorded on a memory and one or more processors that are configured to perform any of the tasks associated with RFID based inventory determination and tracking described herein. Any of the software steps/functions described herein can be embodied in executable instructions recorded on a memory by one or more processors configured to perform the recited steps or functions or to command other units or systems to perform the respective steps or functions.

Figure 1:
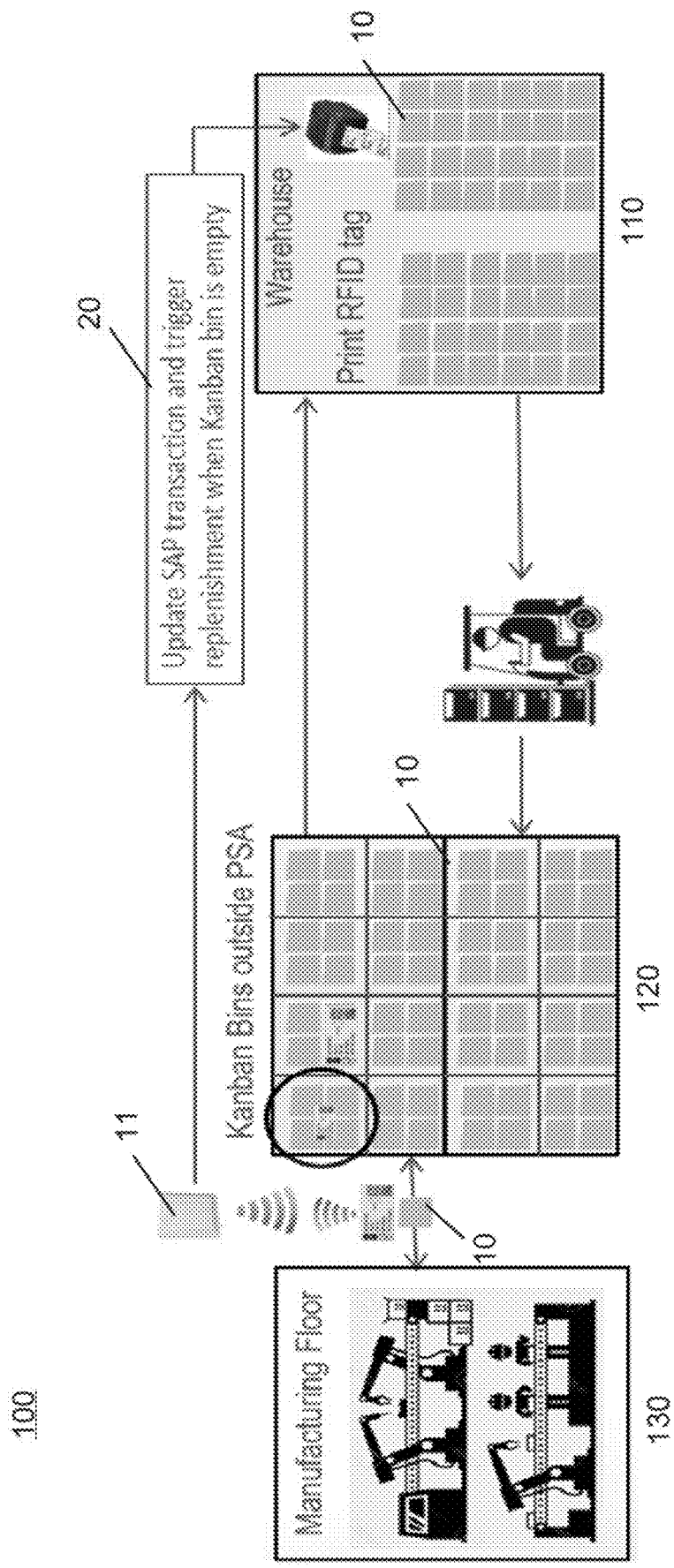
FIG. 1 shows a touch-free RFID Kanban process for managing inventory for product manufacturing, in accordance with some embodiments.

FIG. 1 depicts an exemplary touch-free RFID based Kanban operations system 100 for product manufacturing. Incoming inventory is tagged with RFID tags upon being received in the warehouse 110, then the tagged inventory is transported to designated Kanban Bins in Kanban bin area 120. In some embodiments, RFID tags allow for identification/tracking of the inventory at the warehouse, upon exiting, and upon entry to the Kanban bin area, as well as location tracking in individual Kanban bins. As orders are received, personnel pulls various inventory from the Kanban bins to the manufacturing area 130. RFID detectors 11 at any location (e.g. between the mfg floor and Kanban area) allow for identification/tracking of inventory and real-time updating of inventory as the inventory moves through the workflow. By this approach, the system has determined the available inventory in each area in real-time. Accordingly, the OMS (e.g. ERP, SAP, MES) can automatically initiate a transaction (e.g. transfer order) and trigger replenishment of inventory when the Kanban bin is empty without requiring any additional interactions by personnel to initiate the transaction. In some embodiments, the system can initiate replenishment when inventory is running low, below a certain threshold. In some embodiments, the threshold is variable and can be determined by the OMS (or middle-ware software) as a function of product manufacturing or demand, which can change weekly, daily, hours, etc, so as to ensure inventory in any given area meets demand.

The above procedure contrasts with the conventional card-based Kanban process, which is less inefficient and requires repeated interventions by human personnel, as described previously. FIG. 2 shows an example of the traditional Kanban system 200. 2. In this approach, the warehouse 210 is stocked with inventory items, which are then transported to the Kanban Bin area 220 with designated Kanban cards 1. Manufacturing periodically pulls inventory from the Kanban bins to the manufacturing floor 230, and when a Kanban bin is empty, the Kanban card is carried by the personal and posted to a Kanban board so that personal can initiate a replenishment order, typically through a manually entered SAP transaction. Additionally, the personnel must regularly check the stock in the warehouse 210 and initiate procurement orders to replenish the warehouse stock as needed. As can be seen, this process requires repeated interactions and tasking by human personnel, which is time-consuming and prone to occasional errors. Further, the awareness of inventory in a given area is intermittent such that personnel may be unaware when inventory is low, which can lead to delays in replenishment, particularly when demands change. Additionally, if inventory is misplaced in the warehouse, in the Kanban bins, or on the manufacturing floor, the personnel has no means by which to locate the inventor, which can further cause unexpected inventory shortages and delays in manufacturing.

In one aspect, the RFID Kanban operation described above has marked benefits and advantages over conventional systems, particularly in regard to inventory updating and tracking, transaction cost savings and improved operations. In one aspect, real-time inventory updates as transactions are recorded at actual pull. Accurate inventory in staging areas allows automated system driven cycle counting of Kanban stock. Such systems lower transaction costs. It is estimated that such systems would eliminate 60 man hour per week of manual transactional efforts with RFID automation based on a typical system volume of a mid to large scale systems operation. The systems can seamlessly post SAP transactions in background for consumption of floor stock and can send automated replenishment signals to warehouse. In yet another aspect, such systems can track inventory movements around different sections of the manufacturing floor with additional RFID readers along a given path or route. In still another aspect, such systems realize improved operations by allowing personnel operations to be more efficient, avoiding various manual operations, and further avoids potential line down situations due to missing Kanban inventory.

In another aspect, the RFID Kanban operations described herein gain immediate efficiencies and scale concepts to other use cases. In some embodiments, the RFID technology can significantly increase efficiencies in Kanban material staging and consumption processes. This can provide for: high availability of Kanban stock near production line will give higher throughput, as well as a more efficient fulfillment process for increased manufacturing demands due to high growth rates. Since the RFID technology is a mature concept, the technical risk associated therewith is very low. These systems utilize RFID automation concepts described herein and leverages RFID technology for deployment in areas not previously realized in order to gain process efficiencies not previously possible. In some embodiments, the RFID systems herein can be used in inventory movements automation.

In some embodiments, implementation of an RFID Kanban operation within a system operation can entail various development steps, for example any of the following: i) stockroom and manufacturing business users and operations accept new RFID Kanban process; ii) various RFID hardware installed/interconnected at facilities/rooms and/or routes between facilities/rooms, such hardware can include any of: RFID readers, antennas etc., FID tag label printers and labels; iii) utilization of a middleware application configured to received/process the RFID data and output messages to the OMS, such as Systems Analysis Program (SAP), which can utilize additional add-on RFID technology (e.g. Tagit, VisiTrack); and iv) Internal management system (e.g. OMS, ERP, SAP) integration and Technical team to fetch data from middleware application and process transactions in the management system (e.g. SAP).

In one aspect, the RFID based Kanban operations described herein can be utilized to provide a touch free RFID based Kanban inventory management system for biological testing kit manufacturing. Such operations are particularly advantageous to meet drastic changes in supply and demand due to crises, disasters, epidemics and pandemics, particularly in heavily-impacted industries such as disaster response teams, medical supplies and biological testing. One such example is the global SARS-COVID 19 pandemic, which has heavily impacted medical supply networks and challenges in regard to testing and treatment of patient populations. In one example, the global SARS-COVID 19 pandemic has caused a huge jump in SARS-COVID-19 test kit demand due to the current global pandemic. This demand has required a greatly increased throughput to manufacture SARS-COVID-19 kits to support global testing during the pandemic to save human life. The time constraints and manpower constraints associated with conventional supply and procurements operations has limited the ability of many industries to increase throughputs to meet demand. Further, increasing personnel is impractical in the face of a pandemic, where increased staffing and human interaction in the supply chain, increases risk of healthy patient populations. Use of RFID based solution can be easily scaled up as needed and increase throughput of COVID-19 test kits with reduced man-power to improve efficiency and reduce risk of test kit shortages.

As described previously, traditional operations for product manufacturing, procurement and/or sales, that relies on manual approaches (e.g. Kanban card or 2 BIN system-based replenishment process) rely on human interaction and manual processes, such as manual hand carrying of Kanban cards or emptying BINs an manual transaction postings input into operations management software systems (e.g. ERP, SAP, MES) for replenishment and consumption. Further, there is no real-time awareness or visibility to floor stock inventory. Accordingly, during a crisis, disaster, epidemic or pandemic, where demand for certain products can skyrocket within a few days, shortages of supplies or products may not be detected until it is too late. Traditional systems often rely on historical tracking, estimates and forecasts fail to account for inventory needs for inventory replenishment. RFID based solutions can automatically transact consumption of inventory (e.g. utilizing Kanban or any suitable approach) in real-time and trigger replenishment signals to warehouse as needs change. This results in increased inventory accuracy and lower manual efforts for replenishment and consumption postings in the OMS and associated systems, which can include ERP systems, such as those developed by SAP and Oracle.

Figure 3:
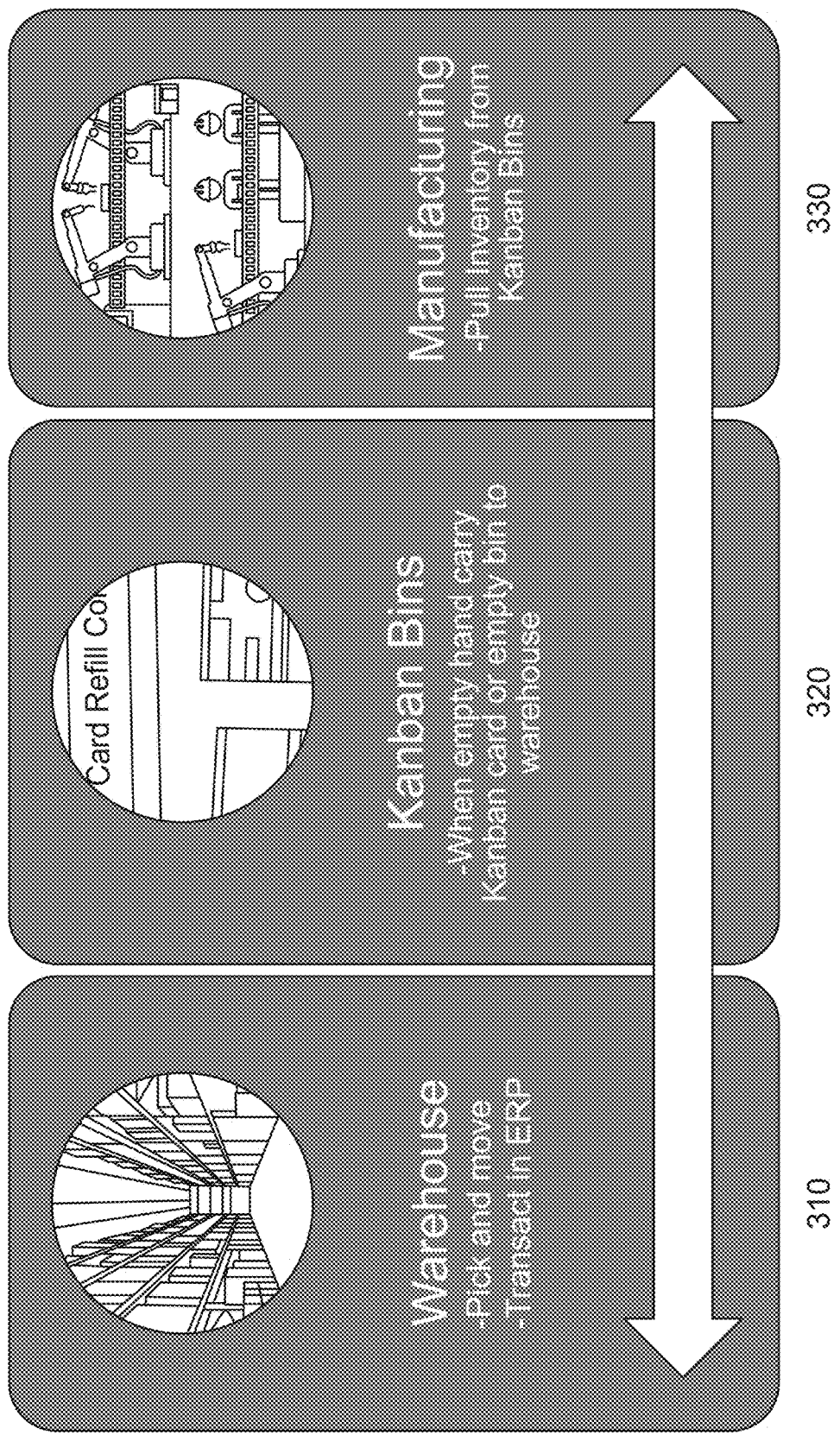
FIG. 3 shows a typical Kanban process for product manufacturing.

FIG. 3 shows an example of a traditional card/2-BIN based Kanban process. In this approach, manual ERP or SAP transactions are posted in advance, personnel hand carries Kanban cards or empty BINs, and manufacturing staff pulls the inventory from the Kanban bins. Among the various drawbacks with this traditional approach is that hand carrying the Kanban cards is time-consuming and requires human personnel, which can introduce mistakes and delays. Further, missing or misplaced cards can result in shortages that stop production lines, and there is no visibility of floor stock.

Figure 4:
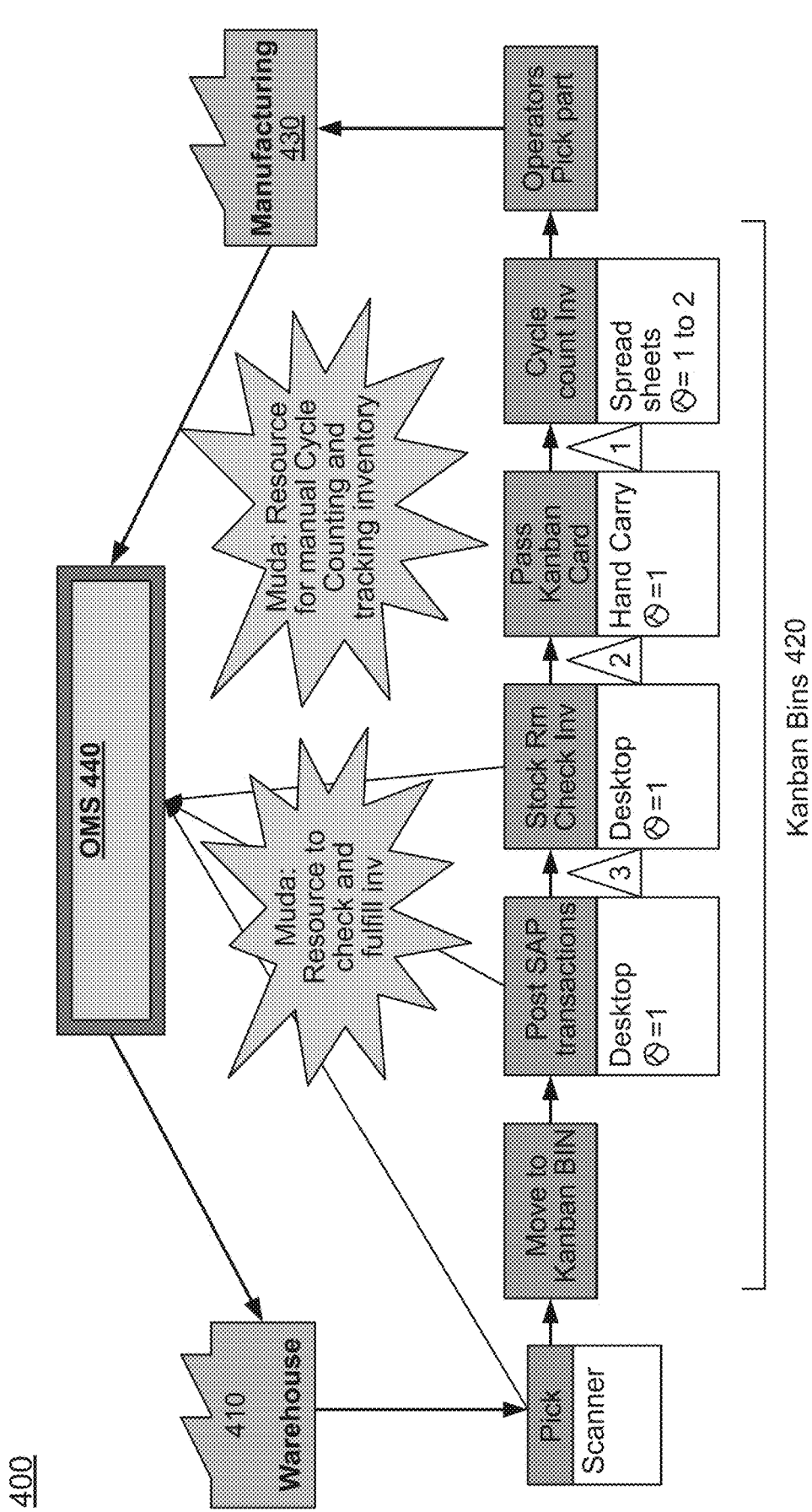
FIG. 4 shows a traditional Kanban process interfacing with an operations management system for product manufacturing, in accordance with some embodiments.

FIG. 4 depicts another example of a traditional card based Kanban process as it interacts with the OMS, which can encompass one or more additional managements, such as ERP/SAP. The OMS utilizes product information for requisitions/supplies to the warehouse. The personnel manually scan the products/supplies received at the warehouse and move them to Kanban BINs, this information can be fed back to the OMS. Operations transaction are posted, which can be input by computer or scanned so that the information can also be fed back to the OMS. Transactions can include orders or requests for production/assembly of products. The supplies/products can be stored in a store room wherein inventory of one or more supplies/products are maintained. The inventory can periodically be checked, by manually scanning and input by computer, and the information can be fed back to the OMS. As personnel receives request/orders/tasks, Kanban cards are posted and posted for cycle count inventor. The operators pick the parts/supplied needs to fulfill the requests/orders and provide the supplied/parts to manufacturing. Manufacturing feeds the information back to the OMS. While this approach works well for consistent demand, the drawbacks noted above can create challenges and result in shortages when demand spikes and availability of personnel is limited. These challenges are further increased during an epidemic or pandemic, where interaction between personnel is discouraged. As detailed herein, the touch-free RFID Kanban operations described herein provide a solution to these challenge of conventional systems.

Figure 5:
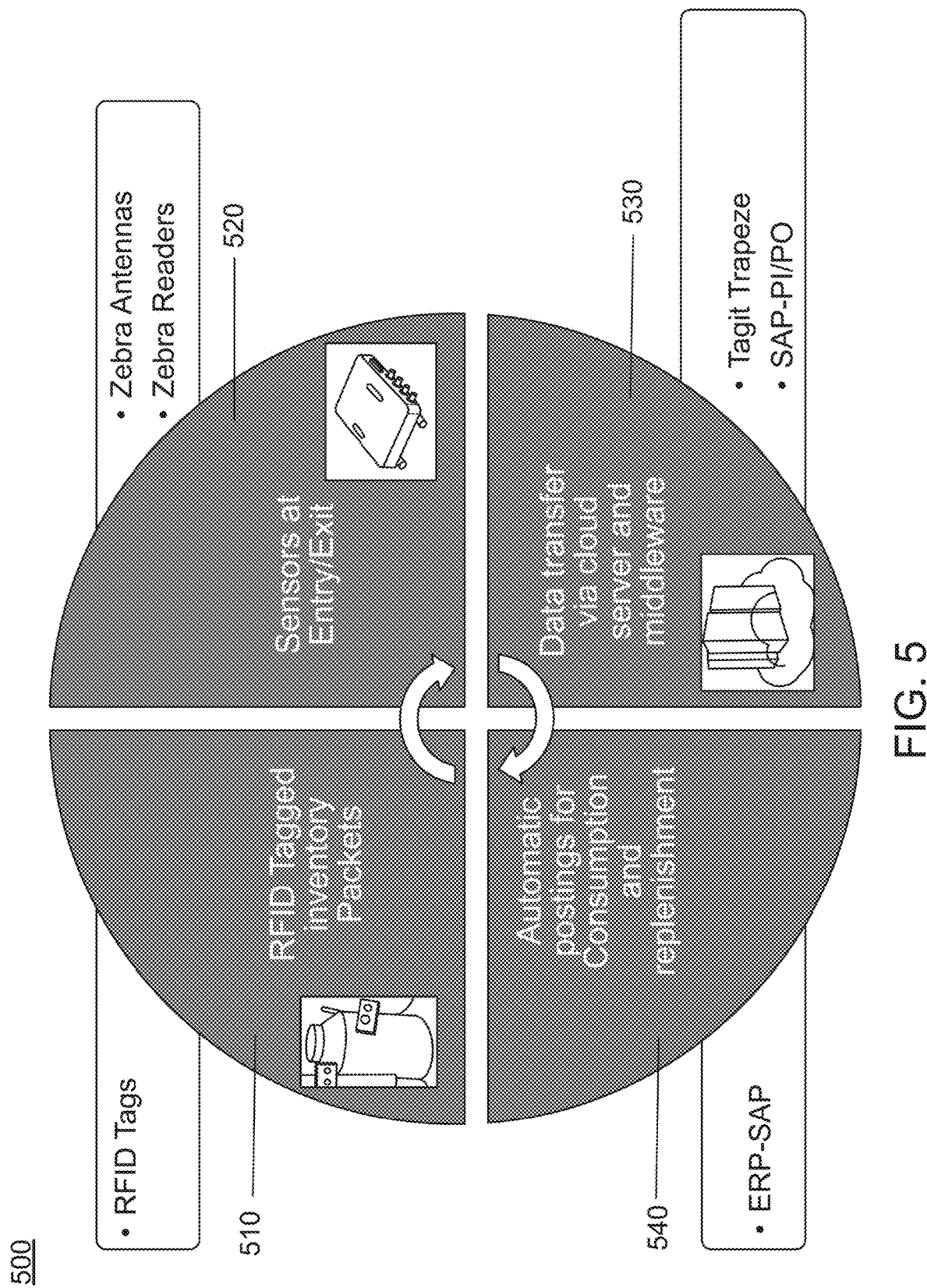
FIG. 5 shows a general workflow of an RFID Kanban inventory management system, in accordance with some embodiments.

FIG. 5 shows a general workflow of a touch free RFID Kanban operation. In this workflow, the warehouse replenishes Kanban inventory packets with RFID tags, manufacturing pulls RFID tagged Kanban inventory packets, RFID data is transmitted to OMS and transactions recorded automatically (Touch Free), live consumption recordings are provided with high inventory accuracy, and automatic replenishment signals are sent to the OMS.

In quadrant 510, the inventory (e.g. supplies/products/components) are RFID tagged. In quadrant 520, as the inventory is moved through the product workflow (e.g. storage, warehouse, holding, production, manufacturing, holding, shipping) the inventory is tracked by sensors (e.g. zebra antenna/zebra readers) at entry/exits at one or more locations along the workflow. It is appreciated that RFID can also be scanned manually, but use of antenna/readers that are mounted at physical locations allow the inventory to be scanned/tracked without requiring any human intervention (e.g. "touchless"). For example, even a fully automated inventory transport/replenishment system would still be tracked by RFID even without any personnel present. Further, multiple individual items could be tracked even when transported in bulk/packets, even when differing types of inventory are transported within the same batch. In quadrant 530, identifying information from the sensors is then transferred into the OMS. In some embodiments, the system utilizes specialized middleware configured for use with the OMS. The middleware can use any suitable data transfer techniques, including data transfer via a cloud server. In quadrant 540, the inventory information is used in automatic postings for consumption and replenishment by the OMS, for example by posting through ERP/SAP. Since this inventory information is real-time, the OMS can make requests for consumption/replenishment/order processing/shipping that is in response to rapid fluctuations in demand, for example, days, during a single day, or even hours, as determined by the OMS. The result is not only improved accuracy and efficiency of workflow with minimal personnel interactions, but improved visibility of inventory in real-time and reduction or elimination of shortages in inventory or delays in shipping orders to meet variable demand.

Figure 6:
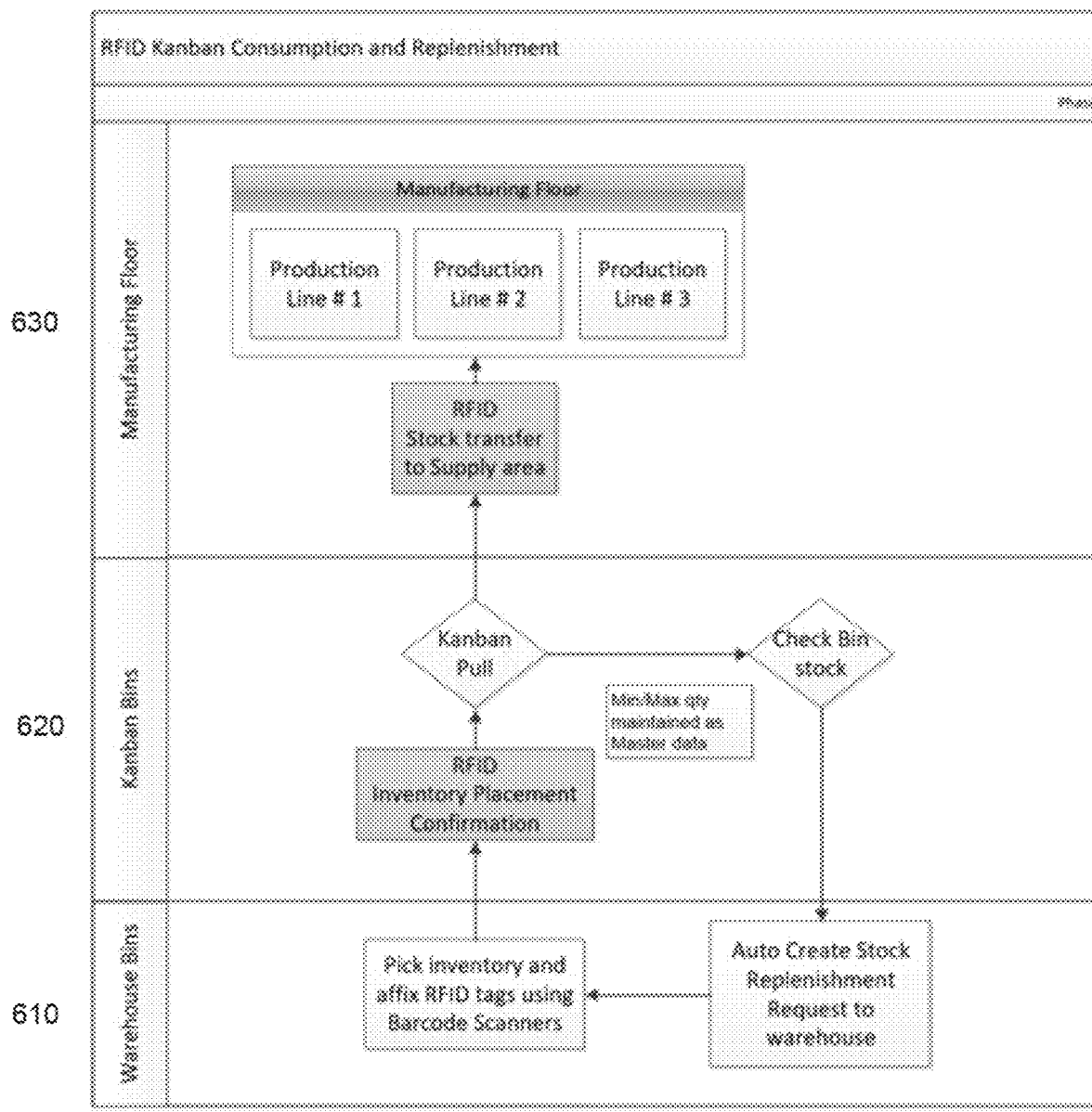
FIG. 6 shows a workflow of an RFID Kanban consumption and replenishment, in accordance with some embodiments.

FIG. 6 shows a schematic of touch-free Kanban operations 600 for RFID Kanban consumption and replenishment. In this operation, the ERP is associated with the following tasks: monitor inventory levels at Kanban Bins; trigger replenishment request to warehouse; warehouse team picks parts and assign RFID tags; interface program post material consumption transactions in ERP and update inventory levels in Kanban bins. Upon integration of RFID, the RFID facilitates the following tasks: sense RFID/inventory movements based on the manufacturing material pull and transfer via entry/exit gates; send RFID tag location data to ERP system via middleware (e.g. Trapeze and SAP-PI/PO middleware system); middleware communicates with the ERP interface programs; and processing of RFID data by integrated RFID software, such as that by Tagit Solutions Inc. This schematic demonstrates that the RFID-based aspects described herein can readily be implemented into an existing Kanban system.

Figure 12:
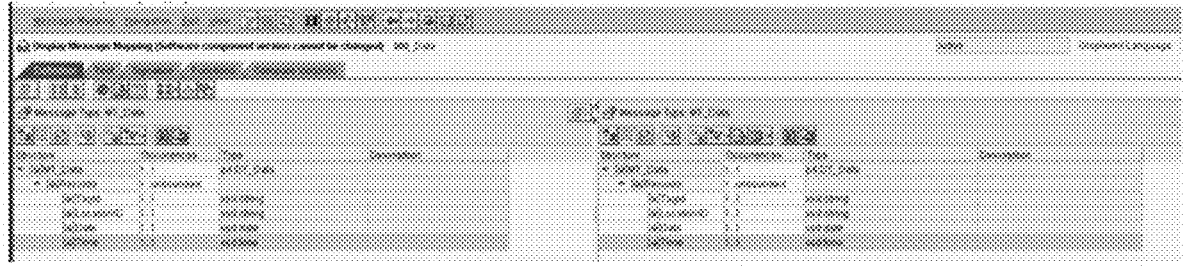
FIG. 12 shows a messaging interface for interfacing the middle-ware with the operation management system, in accordance with some embodiments.

It is appreciated that the system can be designed specifically to interface with a particularly OMS, in particular SAP. Examples of various aspects of a particular SAP implementation include various SAP solutions, for example any of the following:

In some embodiments the SAP solutions include an SAP PI/PO (Process Integration & Orchestration) Interface designed such that middleware (e.g. Trapeze) collects the RFID data (e.g. TAG data) from the sensors at each location (e.g. gate, door, shelf, etc) and processes the data through filtering rules and then send the filtered data to SAP using any suitable communication means (e.g. Webservice calls) to the SAP PI/PO interface. An example of this interface of a display message mapping component is shown in FIG. 12.

Figure 13:
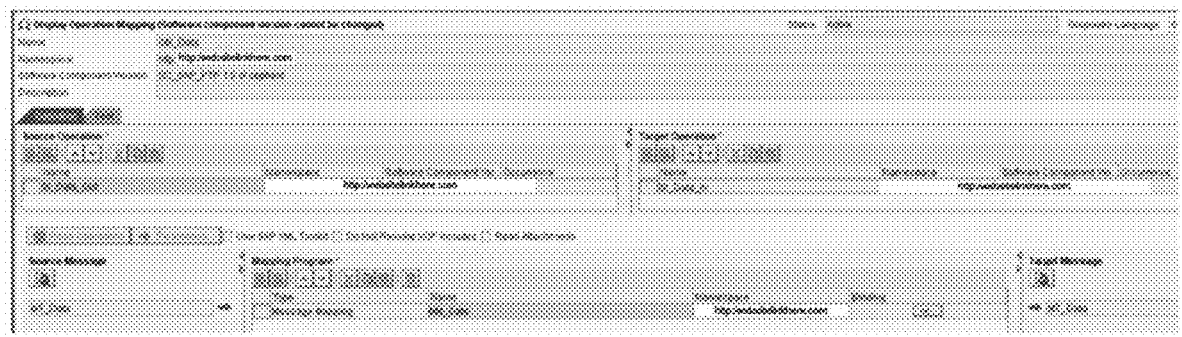
FIG. 13 shows an operation mapping of an interface between the middleware and the operation management system, in accordance with some embodiments.

In some embodiments, the SAP PI/PO can then use a proxy call method to SAP with a suitable interface, for example that shown in FIG. 13.

Figure 14:
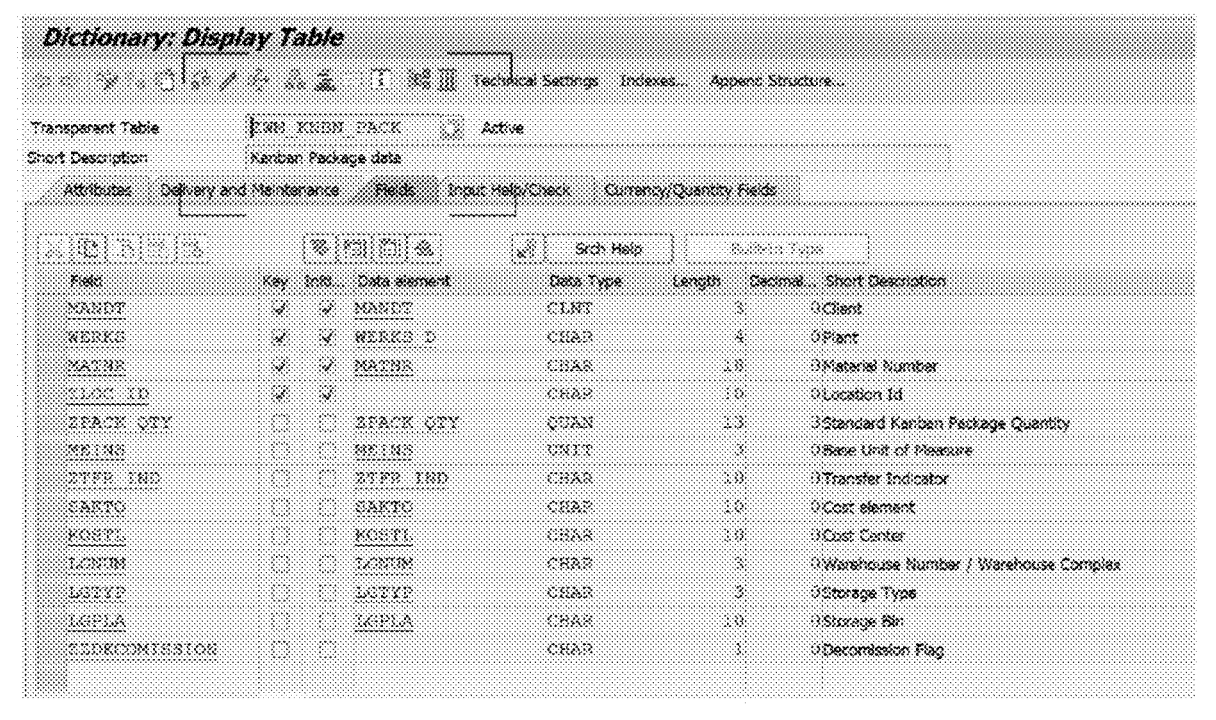

In some embodiments, the SAP solution design includes use of a control table (e.g. ZWN KNBN PACK) by the middle-ware module that maps the nature of the material movement to different manufacturing lines (e.g. reagent manufacturing line, beads manufacturing line, etc). This table is associated to the relevant automated transaction that needs to be performed as the material or inventory is moved in the respective manufacturing lines. An example of such tables are shown in FIGS. 14 and 15.

Figure 16:
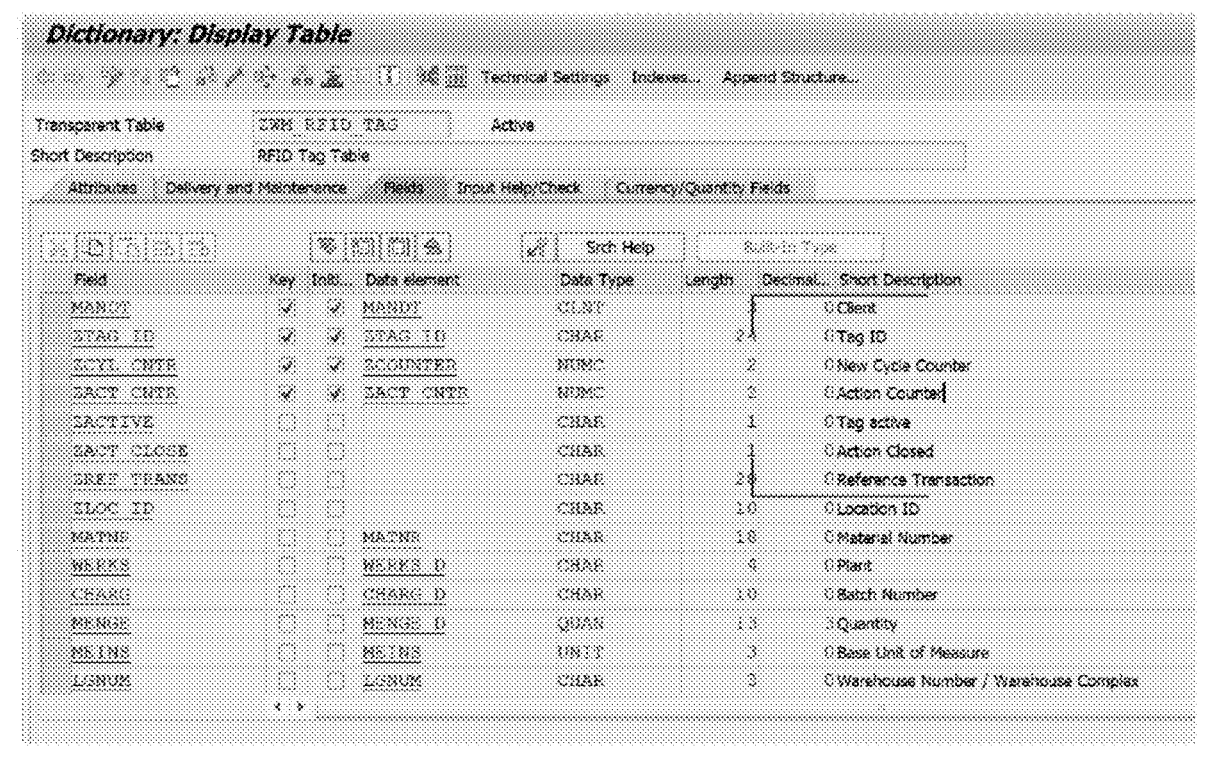
Figure 17:
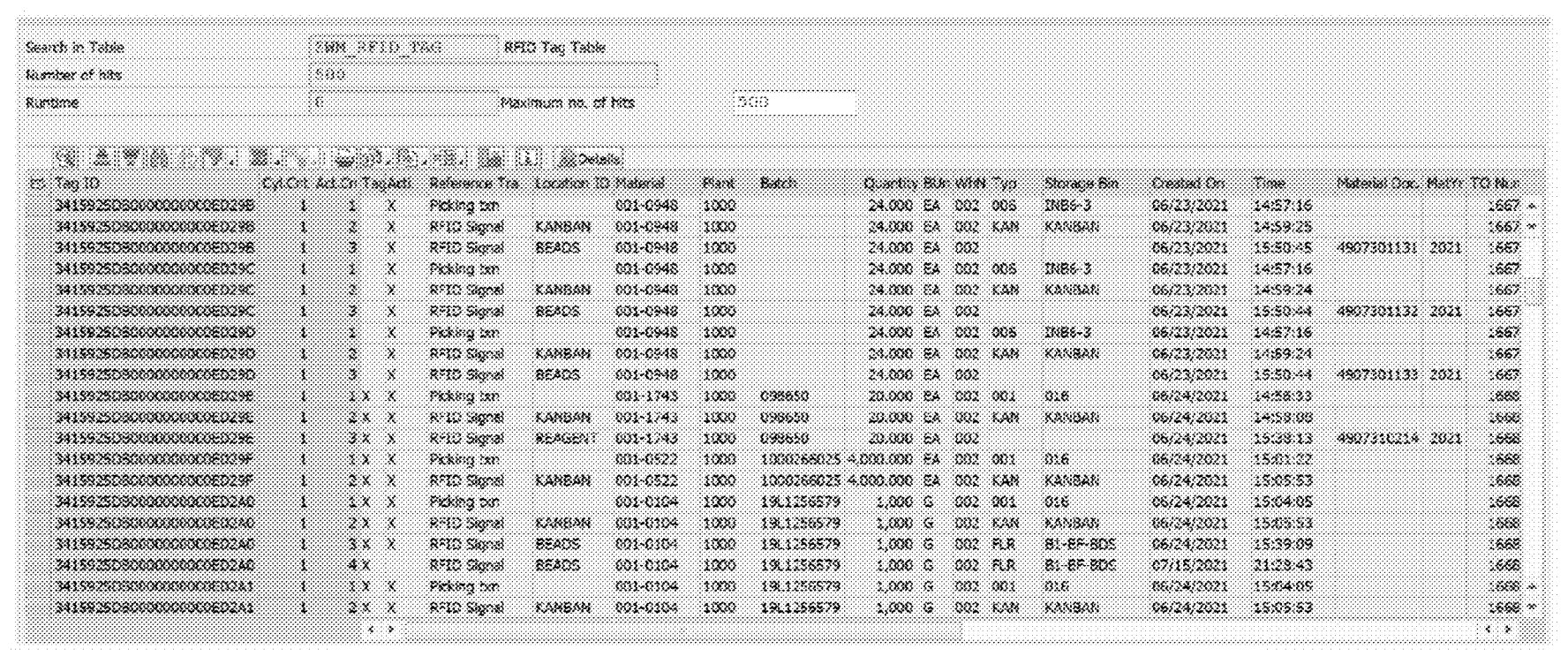

In some embodiments, the SAP solution design includes use of an RFID Tag data table (e.g. ZWM RFID_TAG) that contains the feeds from the middle-ware based on the RFID tagged inventory movements at the different locations (e.g. gates) near manufacturing lines and the Kanban storage area. The gates are named with a location ID pertaining to the respective manufacturing lines and storage area. In some embodiments, this table can hold multiple RECYCLING of the RFID tags. This table can hold info for tracking the complete life cycle of the RFID Tag from the start of the RFID Tag life to the end of the RFID Tag life thru each specific cycle. In some embodiments, the RFID Tags are commissioned during the start of the each life cycle and will be decommissioned at end of each life cycle. An example of such tables are shown in FIGS. 16 and 17.

In another aspect, the SAP implementation solution can include an interface connector code. This SAP program is called by the interface as the RFID Tag data feeds to SAP flow in. The program has any of the following capabilities: 1. Process SAP transaction to post financial transactions to reflect material consumption at the manufacturing lines; 2. Process SAP Transaction to transfer inventory to backflush bins which are eventually transacted to financial accounts; 3. Process SAP transaction to move inventory into Kanban bins; 4. Provide any transactional errors that could potentially occur during posting of the above transactions and flag the record as pending re-processing In yet another aspect, the SAP implementation solution can include a reprocessing program. This program can run in the background and pick up the errored RFID Tag movement transactions and reprocess the transactions automatically. Errors could occur due to missing master data in the control table or other data locks by parallel non-RFID transactions. The background reprocessing program will auto reprocess the errored transaction records once the master data is updated in the control table or the parallel non-RFID transactions are completed.

The above implementations allow for improved yield accuracy based on accurate material consumption data at the manufacturing lines. It is appreciated that any of the aspects described herein could be utilized separately or in combination with any other aspect described herein, or in combination with alternative features than those described herein.

As can be seen in FIG. 6, the RFID tags are affixed to the inventory in the Warehouse 610 when picked in the warehouse bins. The inventory is then placed in the Kanban Bins 620, and the RFID tags allow for inventory placement confirmation. The minimum/maximum quantity can be maintained as master data within the OMS (e.g. ERP/SAP, MES). As orders pull inventory for manufacturing, Kanban pulls occur after which the system can check the bin stock and auto create stock replenishment requests to the warehouse to replace the inventory in the Kanban bins. As the inventory is moved to the Warehouse Floor 630, the RFID tags identifies the stock transferred to the supply area, as the inventory is used in various production lines on the manufacturing floor.

Figure 7:
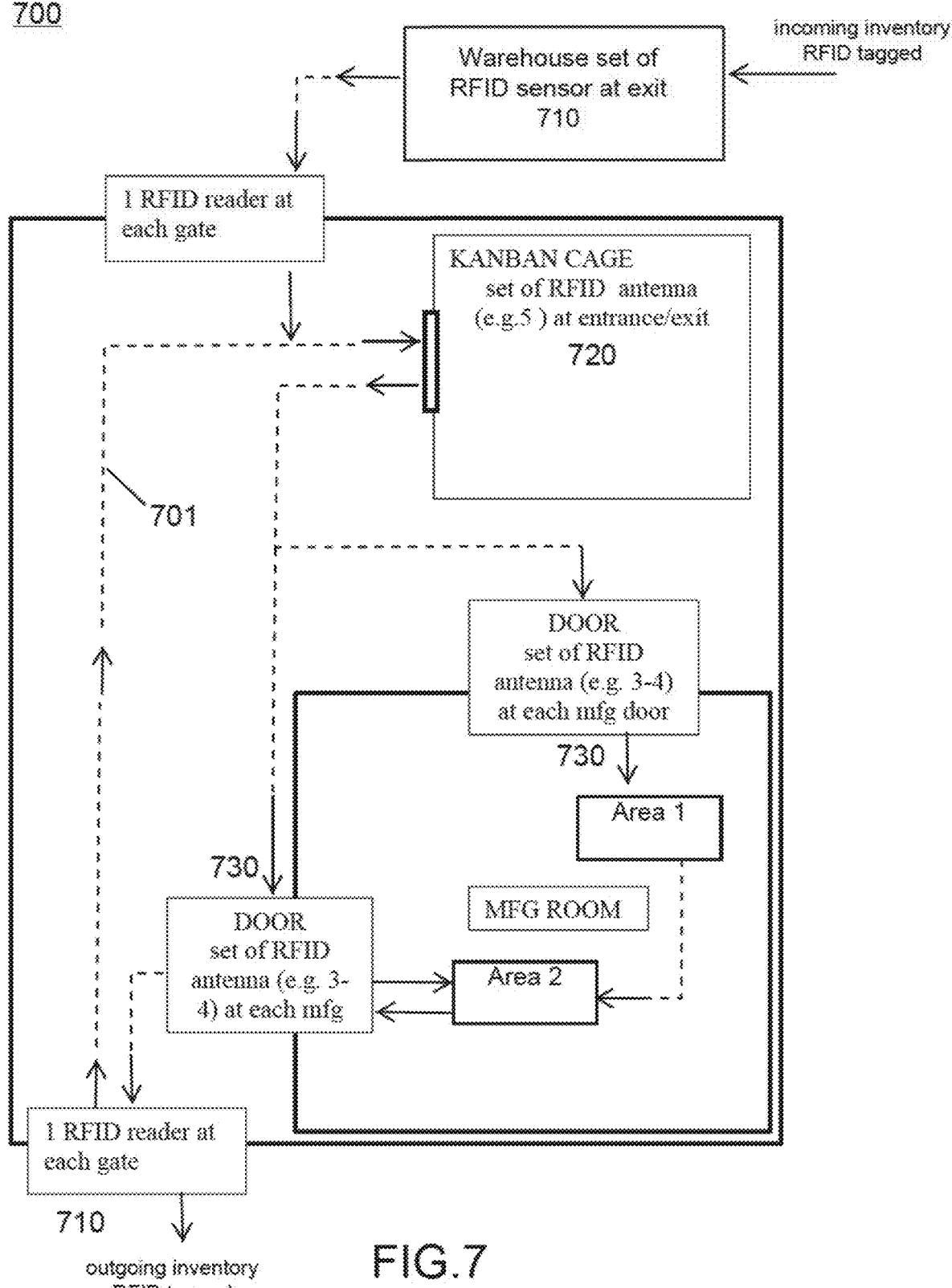
FIG. 7 shows a facility layout of an RFID-based Kanban inventory management system, in accordance with some embodiments.

FIG. 7 shows an RFID infrastructure schematic 700 facilitating a touch-free Kanban operations as described herein. In this embodiment, the incoming inventory is RFID tagged at the warehouse 710 and one or more RFID sensors can be positioned at each gate to the facility to identify/track the inventory upon entry. A set of RFID sensors (e.g. antenna/readers) can be positioned in the Kanban area (e.g. cage), typically at any entry/exit so that the system can identify/track the inventory held in the Kanban bins at any given time. A set of RFID sensors (e.g. antenna/readers) can be positioned at each manufacturing door 730 of the manufacturing room so as to identify/track the inventory pulled for manufacturing. By providing the RFID sensors at any access point to an area, the system ensures that the inventory is accurately tracked no matter which path is taken along the workflow 701. Further, additional RFID sensors can be used to track the location of inventory within different areas (e.g. Area 1, Area 2) of the manufacturing room, so as to prevent delays due to missing or misplaced inventory during production. Additionally, in some embodiments, the manufactured products can be RFID tagged and held in holding areas after manufacturing/production so that the finished product inventory can be identified/tracked during fulfillment and shipment to consumers.

Figure 8:
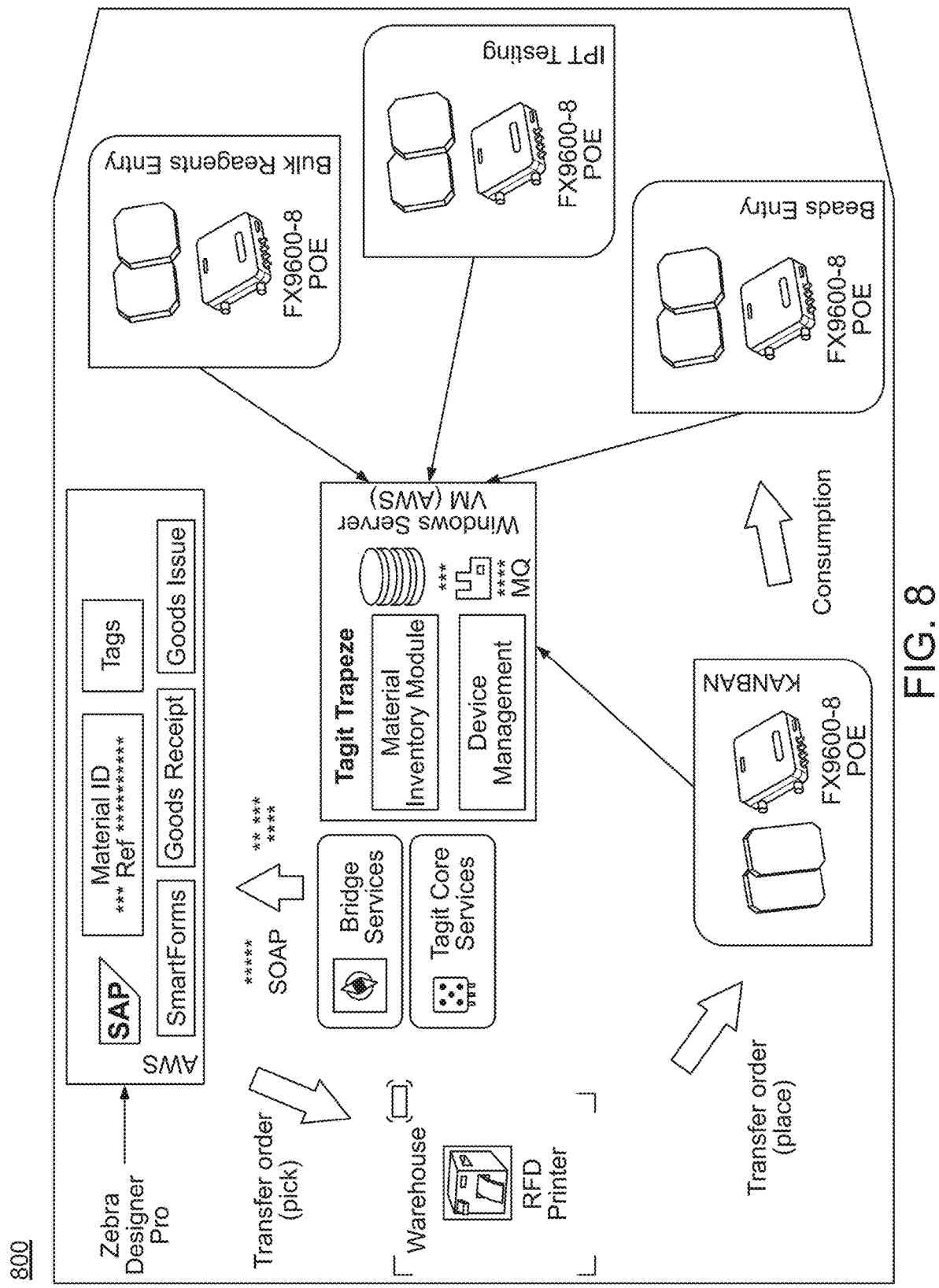
FIG. 8 shows a workflow schematic of an RFID-based Kanban inventory management system for manufacturing of biological testing kits, in accordance with some embodiments.

FIG. 8 shows a schematic 800 of a touch-free RFID operations workflow for manufacturing of biological testing kits. RFID tag processing software (e.g. Tagit Trapeze) can utilize a material inventory module and device management to identify/track workflow of various types of inventory (e.g. bulk reagents, IPT testing, beads) that are used in manufacturing of test kits. The RFID information is fed through a bridge server (e.g. by a middleware module) to the OMS (e.g. ERM/SAP), which can facilitate replenishment orders of inventory, RFID tagging of incoming inventory. In some embodiments, the OMS further facilitates identification/ tracking of the inventory of completed testing kits to facilitate holding, transporting and shipping to consumers.

Figure 9:
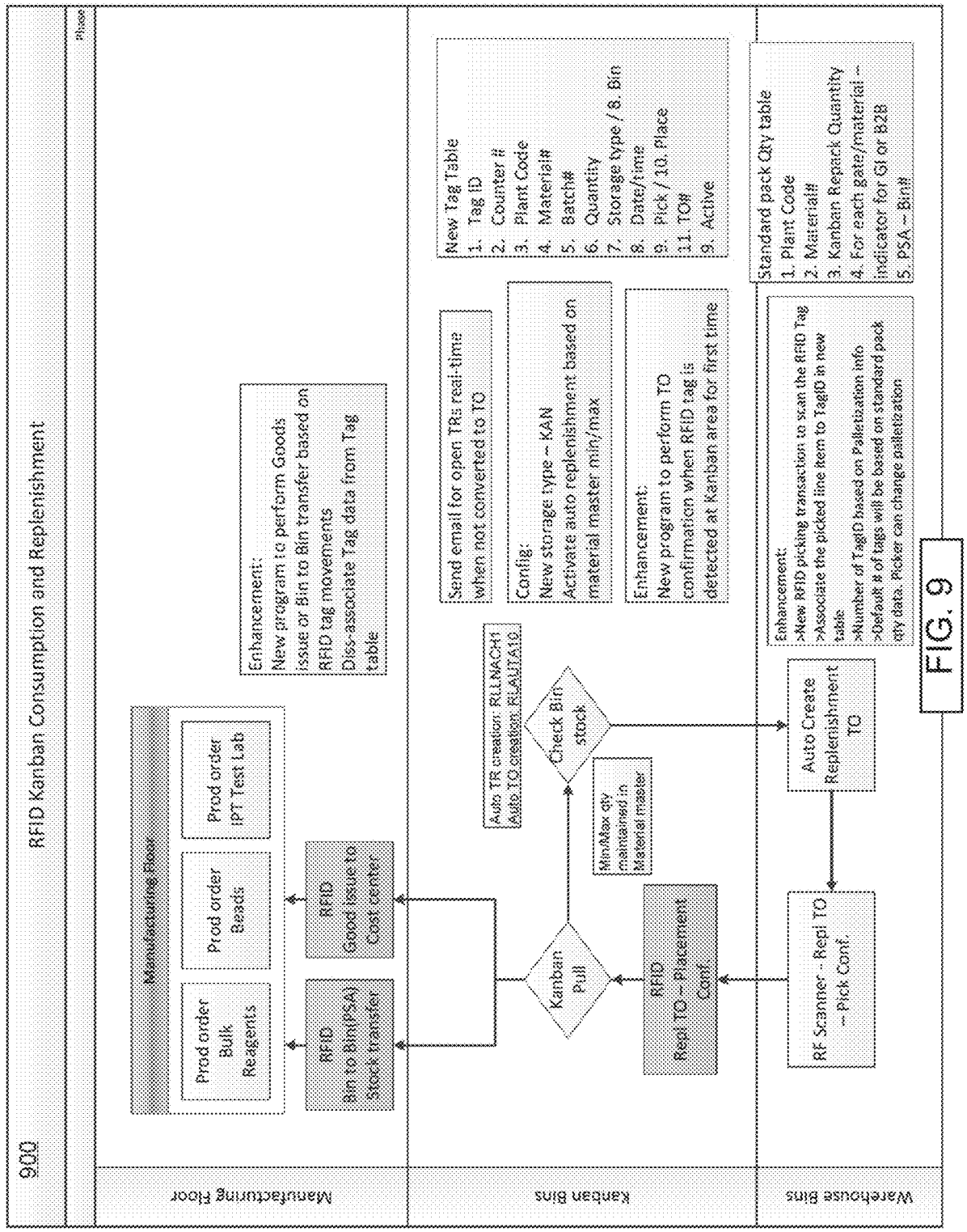
FIG. 9 shows a workflow of a consumption and replenishment by an RFID-based Kanban inventory management system for manufacturing of biological testing kits, in accordance with some embodiments.

FIG. 9 shows another schematic of an example RFID Kanban Consumption and Replenishment Workflow. This operation is similar to that in FIG. 6, but further includes additional enhancements and attributes specific to manufacturing of biological testing kits. It is appreciated that variations of these and the other workflow schematics depicted may be adjusted or modified according to the requirements of a particular type of manufacturing operation, in accordance with the concepts described herein.

Figure 10:
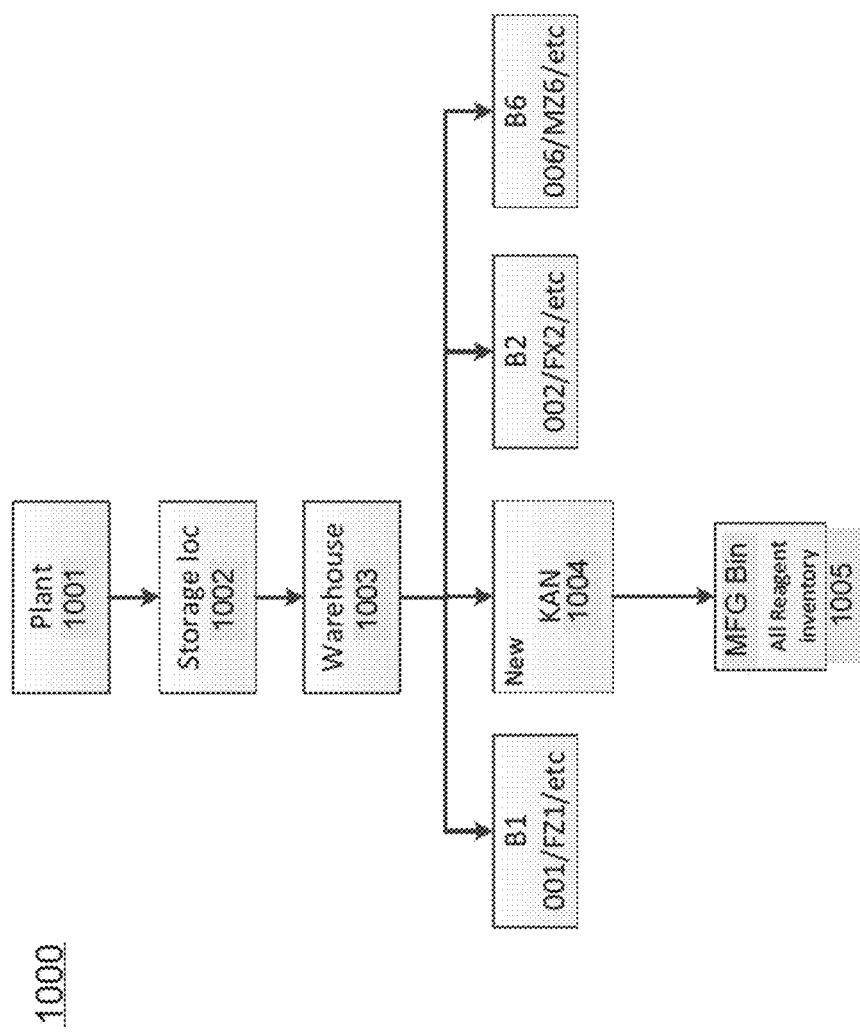
FIG. 10 shows a flowchart of aspects of workflow of product manufacturing suited for management by an RFID-based system, in accordance with some embodiments.

FIG. 10 shows a simplified schematic 1000 of the path of inventory from the production plant 1001, to a storage location 1002, to the warehouse 1003 of the manufacturer (where the inventory is RFID tagged), then to the Kanban bins 1004 (at which various other inventory is also maintained) and ultimately to a manufacturing bin 1005 where all reagent inventory is maintained in the manufacturing bin. This is a typical workflow for supplying reagent materials in manufacturing of biological test kits, which require a constantly replenished supply of various types of reagents.

Figure 11:
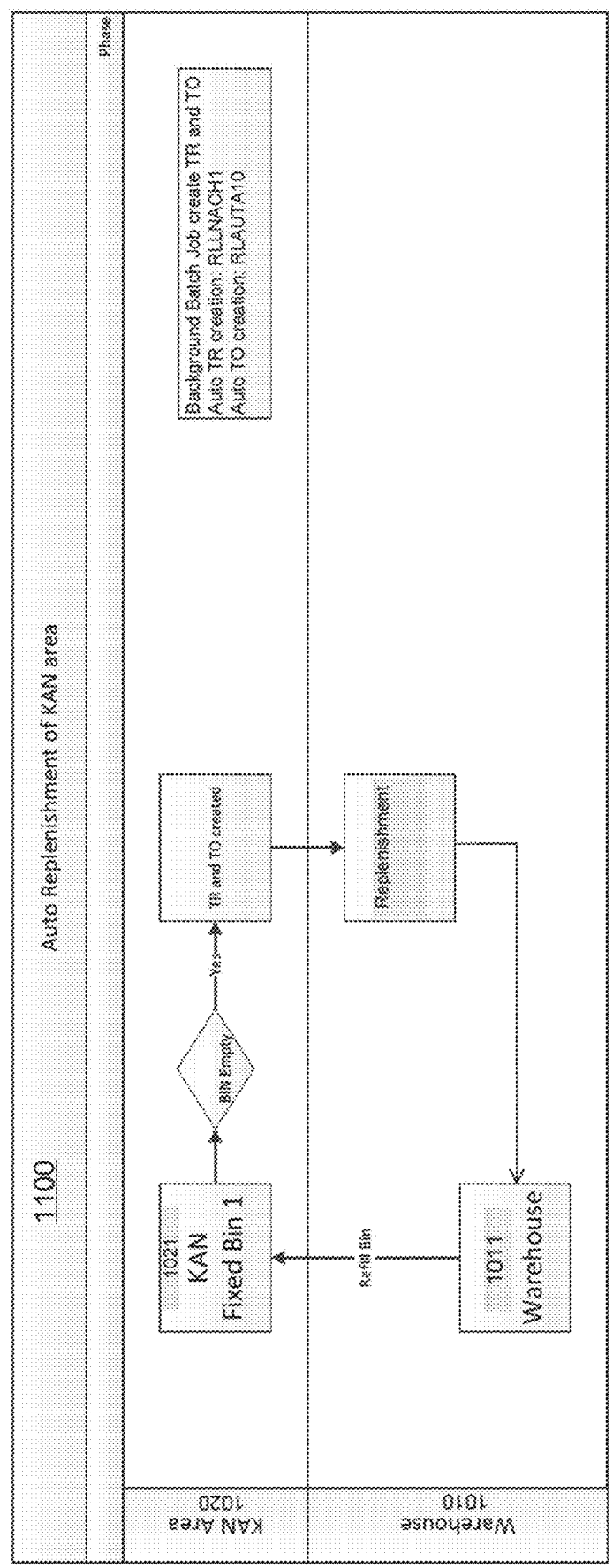
FIG. 11 shows a workflow of automatic consumption and replenishment by an RFID-based Kanban inventory management system, in accordance with some embodiments.

FIG. 11 shows a simplified schematic 1100 of an Auto Replenishment operation of the inventory in the Kanban Bin area. As in previous embodiments, the inventory is RFID tagged in the Warehouse and stored in a warehouse bin area 1011 or holding location, then items are pulled to the Kanban area 1020 and placed temporarily in Kanban Bins 1021. Upon depletion of the Kanban bin as determined by RFID detection, the system automatically creates a transfer request (TR) and transfer order (TO) that is sent to the warehouse for replenishment.

As detailed herein the touch-free RFID operations provide considerable benefits over the traditional operations systems for product manufacturing, particularly during crises, disasters or pandemics, where availability of on-site personnel may be limited or reduced. For example, the SARS-COVID-19 pandemic required on-site staff reductions to essential employees, and a RFID based system allows for product manufacturing workflow to be performed with minimal interaction between personnel in transporting/replenishing inventory. Further, the RFID based system allows remote workers access inventory information and product flow data in real-time. In some embodiments, RFID based solutions provide automated transactions by sharing data in real-time via cloud based services. These systems improved accuracy and efficiency as real-time data reduced manufacturing downtime. Inventory counts improved to minutes instead of hours allowing inventory audits daily. No touch tracking of the chemicals or harmful substances reduces human interaction, thus reducing the risk of SARS-COVID-19 infections to employees and reducing risk of mandatory shut-downs. The RFID solutions described herein provide improved efficiency and accuracy by allowing manufacturers to produce more product with fewer personnel, particularly during demanding times, such as the SARS COVID-19 pandemic when COVID-19 test kits demand was paramount and conventional production management operations were found lacking.

The above-described approach provides various benefits. In one aspect, real-time inventory updates as transactions are recorded at actual pull. Accurate inventory in Kanban staging area allow system driven cycle counting of Kanban stock. In another aspect, this approach provides lower transaction costs. Specifically, it can save manual transactional efforts with RFID automation based on consumption volumes; seamlessly post OMS (e.g. ERP, SAP, MES) transactions in background for consumption of floor stock; and send automated replenishment signals to warehouse and vendors. In yet another aspect, this approach allows for improve inventory tracking, for example, it can track inventory movements around different sections of a manufacturing floor. This improved tracking can avoid potential line down situations due to missing or misplaced Kanban inventory.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art. Each of the references cited herein are incorporated herein by reference for all purposes.

Although the above description contains many specificities, these should not be construed as limitations on the scope of the invention, but merely as illustrations of some of the presently preferred embodiments. Many possible variations and modifications to the invention will be apparent to one skilled in the art upon consideration of this disclosure.

What is claimed is:

1. A RFID based inventory management system for product manufacturing comprising:
   a plurality of RFID tags associated with various types of inventory used in manufacturing a product in a workflow, the workflow comprising a warehouse area, a Kanban bin area with one or more Kanban bins, and a manufacturing area;
   a plurality of RFID sensors at one or more locations along a path of the workflow, the plurality of RFID sensors being disposed at fixed locations including a portion of the path extending between i) the warehouse area and the Kanban bin area and ii) a portion of the path between the Kanban bin area and the manufacturing area so that the system automatically detects inventory being transported along the path;
   an operations management system configured to perform replenishment requests of inventory of various types;
   wherein the operations management system is configured to:
     receive inventory tracking information from the plurality of RFID sensors;
     determine an amount of a first type of inventory at a given location;
     automatically initiate a replenishment request for a first type of inventory upon a determination that the first type of inventory is depleted.

2. The RFID based inventory management system of claim 1, wherein the operation management system comprises SAP and/or ERP software and further comprises a middle-ware software module that interfaces with the SAP and/or ERP software, wherein the middle-ware software module receives detection data from the plurality of RFID sensors and determines an inventory of a particular type of inventory based on the detection data.

3. The RFID based inventory management system of claim 1, wherein the operation management system is configured to determine the amount of inventory in the Kanban bin area and initiates a replenishment request that is sent to the warehouse.

4. The RFID based inventory management system of claim 1, wherein the system is configured to determine the amount of the particular type of inventory in the Kanban area based on detections of the RFID sensors between the Kanban Bin area and the Warehouse and detections of the RFID sensors between the manufacturing area and the Kanban Bin area.

5. The RFID based inventory management system of claim 1, wherein the plurality of RFID sensors comprise one or more RFID sensors in the warehouse, and wherein the operation system is further configured to initiate a purchase order to procure new inventory upon determination of depleted inventory in the warehouse area based on detections of the RFID sensors in the warehouse area.

6. The RFID based inventory management system of claim 1, wherein the operations system is configured to determine depletion of inventory based on real-time determination of inventory in differing locations along the workflow.

7. The RFID based inventory management system of claim 1, wherein the operations system is configured to determine depletion of inventory based on real-time determination of inventory in differing locations along the workflow and a real-time determination of demand that is variable.

8. The RFID based inventory management system of claim 2, wherein the middle-ware software module is configured to collect data from the plurality of RFID tags and apply a plurality of filtering rules to the data before sending to an interface of the SAP and/or ERP software.

9. The RFID based inventory management system of claim 8, wherein the middle-ware software module is further configured to apply a proxy call method to interface with the SAP and/or ERP software.

10. The RFID based inventory management system of claim 2, wherein the middle-ware software module is further configured to access a control table of the operation management system and map a nature of a movement of a plurality of materials to different manufacturing lines.

11. The RFID based inventory management system of claim 2, wherein the middle-ware software module is further configured to access an RFID tag data table of the SAP and/or ERP software and communicate feeds of RFID tagged inventory movements.

12. A method of managing inventory for product manufacturing utilizing an RFID-based management system, the method comprising:
producing RFID tags associated with various types of inventory used in manufacturing a product in a workflow, the workflow comprising a warehouse area, a Kanban bin area with one or more Kanban bins, and a manufacturing area, wherein the path extends between the respective areas, each of the RFID tags applied to the various types of inventory;
detecting the various types of inventory with a plurality of RFID sensors at one or more locations along a path of the workflow, the plurality of RFID sensors being disposed at fixed locations including a portion of the path extending between i) the warehouse area and the Kanban bin area and ii) a portion of the path between the Kanban bin area and the manufacturing area so that the system automatically detects inventory being transported along the path; receive inventory tracking information from the plurality of RFID sensors with an operations management system (OMS);
determine, with the OMS, an amount of a first type of inventory at one or more locations along the workflow; and
automatically initiating, with the OMS, a replenishment request for a first type of inventory upon a determination that the first type of inventory is depleted.

13. The method of claim 10, further comprising:
wherein the operation management system comprises any of SAP and ERP software, and further comprises a middle-ware software module that interfaces with the SAP and/or ERP software, wherein the middle-ware software module receives detection data from the plurality of RFID sensors and determines an inventory of a particular type of inventory based on the detection data.

14. The method of claim 12, wherein the various types of inventory are tagged upon being received in the warehouse, and the operation management system determines the amount of inventory in the Kanban bin area based on detection data from the plurality of RFID sensors and the replenishment request is sent to the warehouse.

15. The method of claim 12, wherein the plurality of RFID sensors comprise one or more RFID sensors in the warehouse for determination of warehouse stock in real-time, the method further comprising:
initiating, with the OMS, a purchase order to procure new inventory upon determination of depleted inventory in the warehouse area based on detections of the RFID sensors in the warehouse area.

16. The method of claim 12, further comprising:
determining, with the OMS, depletion of the first type of inventory at any given location along the path based on real-time determination of the inventory at any given location in the workflow based on the detection data from the plurality of RF sensors.

17. The method of claim 12, further comprising:
determining, with the OMS, depletion of the first type of inventory based on real-time determination of the inventory at a given location in the workflow and a determination of an inventory demand that is variable.

18. The method of claim 13, further comprising:
collecting data, with the middle-ware software module, from the plurality of RFID tags and applying, with the middle-ware software module, a plurality of filtering rules to the data before sending to the ERP and/or SAP.

19. The method of claim 18, wherein the middle-ware software module is further configured to apply a proxy call method to interface with the SAP and/or ERP software.

20. The method of claim 13, further comprising:
accessing, with the middle-ware software module, a control table of the operation management system and mapping a nature of a movement of a plurality of materials to different manufacturing lines.

21. The method of claim 13, further comprising:
accessing, with the middle-ware software module, an RFID tag data table of the SAP and/or ERP software and communicate feeds of RFID tagged inventory movements.

* * * * *